US010937110B2

(12) United States Patent
Takashima

(10) Patent No.: US 10,937,110 B2
(45) Date of Patent: Mar. 2, 2021

(54) TAX CALCULATOR, TAX CALCULATION METHOD, AND STORAGE MEDIUM STORING PROGRAM

(71) Applicant: CASIO COMPUTER CO., LTD., Tokyo (JP)

(72) Inventor: Toshibumi Takashima, Kunitachi (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 433 days.

(21) Appl. No.: 15/395,291

(22) Filed: Dec. 30, 2016

(65) Prior Publication Data

US 2017/0278196 A1     Sep. 28, 2017

(30) Foreign Application Priority Data

Mar. 24, 2016 (JP) .............................. JP2016-060759

(51) Int. Cl.
| | |
|---|---|
| *G06Q 40/00* | (2012.01) |
| *G06F 3/14* | (2006.01) |
| *G06F 3/02* | (2006.01) |
| *G06F 15/02* | (2006.01) |

(52) U.S. Cl.
CPC ............. *G06Q 40/123* (2013.12); *G06F 3/02* (2013.01); *G06F 3/14* (2013.01); *G06F 15/025* (2013.01)

(58) Field of Classification Search
CPC .................................................. G06Q 40/123
See application file for complete search history.

(56) References Cited

U.S. PATENT DOCUMENTS

| | | | | |
|---|---|---|---|---|
| 7,249,072 B1* | 7/2007 | Nearhood | .............. | G06Q 10/10 705/31 |
| 2005/0189410 A1* | 9/2005 | Brown | ................... | G06Q 10/00 235/379 |
| 2006/0190382 A1* | 8/2006 | Psencik | ................... | G06F 15/02 705/37 |
| 2007/0255634 A1* | 11/2007 | Alley | .................... | G06Q 10/00 705/35 |

(Continued)

FOREIGN PATENT DOCUMENTS

| | | |
|---|---|---|
| JP | S57-189265 A | 11/1982 |
| JP | H06-250978 A | 9/1994 |

(Continued)

*Primary Examiner* — Scott C Anderson
(74) *Attorney, Agent, or Firm* — Fitch, Even, Tabin & Flannery LLP

(57) ABSTRACT

According to one embodiment, a tax calculator displays a first tax-included amount, responding to a first input operation relating to a first tax rate, for a first numerical value indicating a tax-excluded amount; displays a second tax-included amount, responding to a second input operation relating to a second tax rate, for a second numerical value indicating a tax-excluded amount; displays a tax-included grand total amount calculated by totaling a first tax-included total amount indicating a total of the first tax-included amount, and a second tax-included total amount indicating a total of the second tax-included amount; and displays the first tax-included total amount responding to the first input operation after the tax-included grand total amount was displayed, or the second tax-included total amount responding to the second input operation after the tax-included grand total amount was displayed.

24 Claims, 9 Drawing Sheets

(56) References Cited

U.S. PATENT DOCUMENTS

| | | | | |
|---|---|---|---|---|
| 2009/0013018 A1* | 1/2009 | Baer | .................... | G06F 17/246 |
| | | | | 708/3 |
| 2010/0250376 A1* | 9/2010 | Nandiraju | ............ | G06Q 20/202 |
| | | | | 705/17 |
| 2012/0203645 A1* | 8/2012 | Sutter | .................... | G06Q 30/04 |
| | | | | 705/19 |

FOREIGN PATENT DOCUMENTS

| | | |
|---|---|---|
| JP | H10-143472 A | 5/1998 |
| JP | 2000-268002 A | 9/2000 |
| JP | 2015-102881 A | 6/2015 |

\* cited by examiner

TAX RATE SETTING PROCESS
↓
B1 — OPERATE TAX-INCLUDED 1 KEY
↓
B2 — DISPLAY TAX RATE 1
↓
B3 — INPUT TAX RATE 1
↓
B4 — REGISTER SETTING BY [%] KEY
↓
END

| REGISTRATION DATA | TAX EXCLUDED AMOUNT | TAX INCLUDED AMOUNT | TAX AMOUNT |
|---|---|---|---|
| TAX RATE 1 = 10 % | | | |
| | 1,000 | 1,100 | 100 |
| | 200 | 220 | 20 |
| | 5,000 | 5,500 | 500 |
| | 1,500 | 1,650 | 150 |
| TOTAL | 7,700 | 8,470 | 770 |
| TAX RATE 2 = 8 % | | | |
| | 2,000 | 2,160 | 160 |
| | 3,000 | 3,240 | 240 |
| | 400 | 432 | 32 |
| TOTAL | 5,400 | 5,832 | 432 |
| GRAND TOTAL | 13,100 | 14,302 | 1,202 |

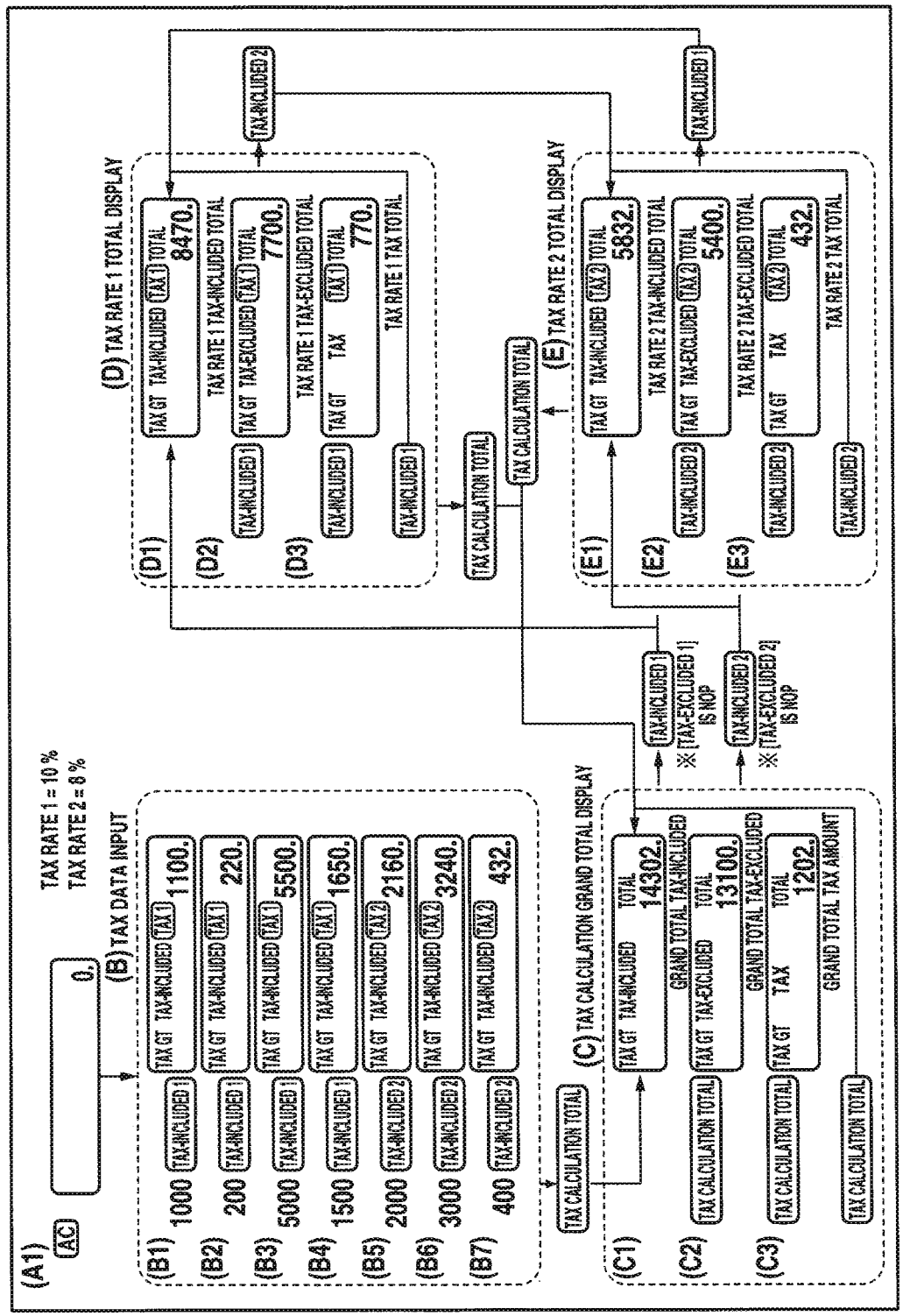

FIG.10

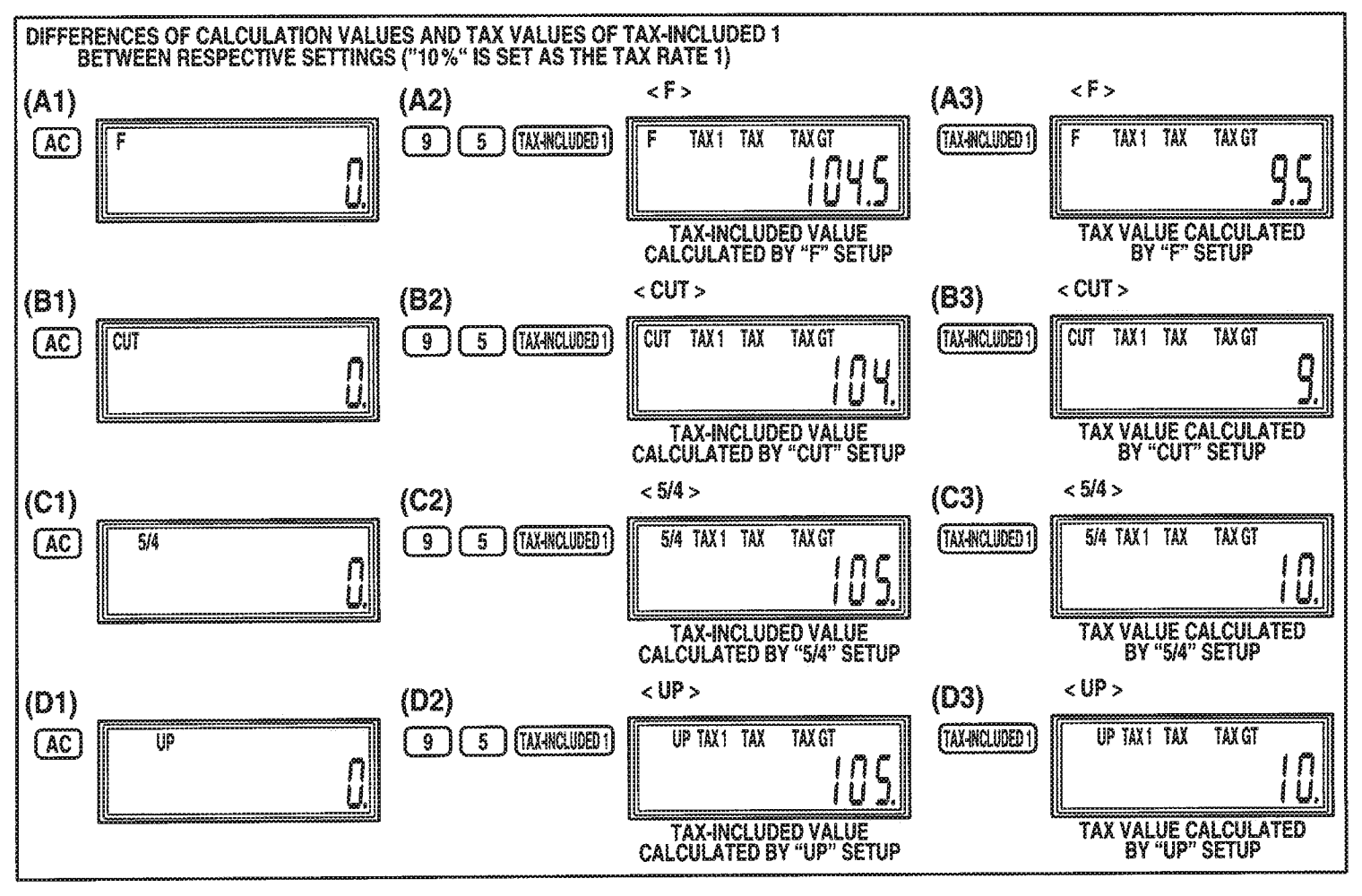

DIFFERENCES OF CALCULATION VALUES AND TAX VALUES OF TAX-INCLUDED 1 BETWEEN RESPECTIVE SETTINGS ("10%" IS SET AS THE TAX RATE 1)

… (1)

TAX CALCULATOR, TAX CALCULATION METHOD, AND STORAGE MEDIUM STORING PROGRAM

CROSS-REFERENCE TO RELATED APPLICATION

This application is based upon and claims the benefit of priority from Japanese Patent Application No. 2016-060759, filed Mar. 24, 2016, the entire contents of which are incorporated herein by reference.

BACKGROUND OF THE INVENTION

Field of the Invention

The present invention relates generally to a tax calculator, a tax calculation method, and a storage medium storing a program.

Description of the Related Art

In recent years, there is known a calculation device (electronic calculator) having a function of performing a tax calculation by using a plurality of tax rates. For example, in an electronic calculator disclosed in Jpn. Pat. Appln. KOKAI Publication No. H10-143472, an arbitrary operation of the four basic arithmetic operations is performed. In a state in which a numerical value (amount), which is a target of multiplication, is displayed, if a tax-included key (confirmation key) is operated, a tax-included amount based on a first tax rate for the displayed numerical value is calculated and displayed. Similarly, if the tax-included key (confirmation key) is operated, a tax-included amount based on a second tax rate for the displayed numerical value is calculated and displayed.

In addition, in an electronic calculator disclosed in Jpn. Pat. Appln. KOKAI Publication No. 2000-268002, tax rates of up to eight kinds can be set in a tax rate memory, and a tax rate can be selected by designating a number. In this calculator, after the tax rate was selected, if an arithmetic operation and "tax-included" are successively input-operated, a tax-included calculation corresponding to the selected tax rate for a numerical value, which is a result of the arithmetic operation, is executed, and the tax-included amount is displayed.

As described above, in the calculator of the prior art, a tax calculation for plural tax rates can be executed. However, a tax calculation based on one selected tax rate is simply executed. Specifically, since tax calculations based on plural tax rates cannot be executed, it is difficult to calculate a tax-included total amount by a simple operation, for example, when a plurality of commodities with different tax rates are mixedly present.

The present invention has been made in consideration of the above-described problem, and the object of the invention is to provide a tax calculator, a tax calculation method, etc., which can perform a tax calculation based on a plurality of tax rates by a simple operation.

BRIEF SUMMARY OF THE INVENTION

In order to solve the above problem, according to one embodiment, there is provided a tax calculator including a display and a processor, the processor being configured to:

execute control to display on the display a first tax-included amount, which is calculated based on a first tax rate, in response to a first input operation relating to the first tax rate with respect to at least one first numerical value which indicates a tax-excluded amount displayed on the display;

execute control to display on the display a second tax-included amount, which is calculated based on a second tax rate, in response to a second input operation relating to the second tax rate with respect to at least one second numerical value which indicates a tax-excluded amount displayed on the display;

execute control to display on the display a tax-included grand total amount which is calculated by totaling a first tax-included total amount indicating a total of the first tax-included amount corresponding to the at least one first numerical value, and a second tax-included total amount indicating a total of the second tax-included amount corresponding to the at least one second numerical value; and execute control to display, after the tax-included grand total amount was displayed, the first tax-included total amount on the display in response to the first input operation, or execute control to display, after the tax-included grand total amount was displayed, the second tax-included total amount on the display in response to the second input operation.

BRIEF DESCRIPTION OF THE DRAWINGS

FIG. 7 is a view illustrating concrete examples of input operations and display for describing the tax calculation function of the electronic calculator in the embodiment.

FIG. 10 is a view illustrating concrete examples of input operations and display for describing the tax calculation function of the electronic calculator in the embodiment.

DETAILED DESCRIPTION OF THE PREFERRED EMBODIMENT

Embodiments of the invention will be described hereinafter with reference to the accompanying drawings.

Figure 1A:
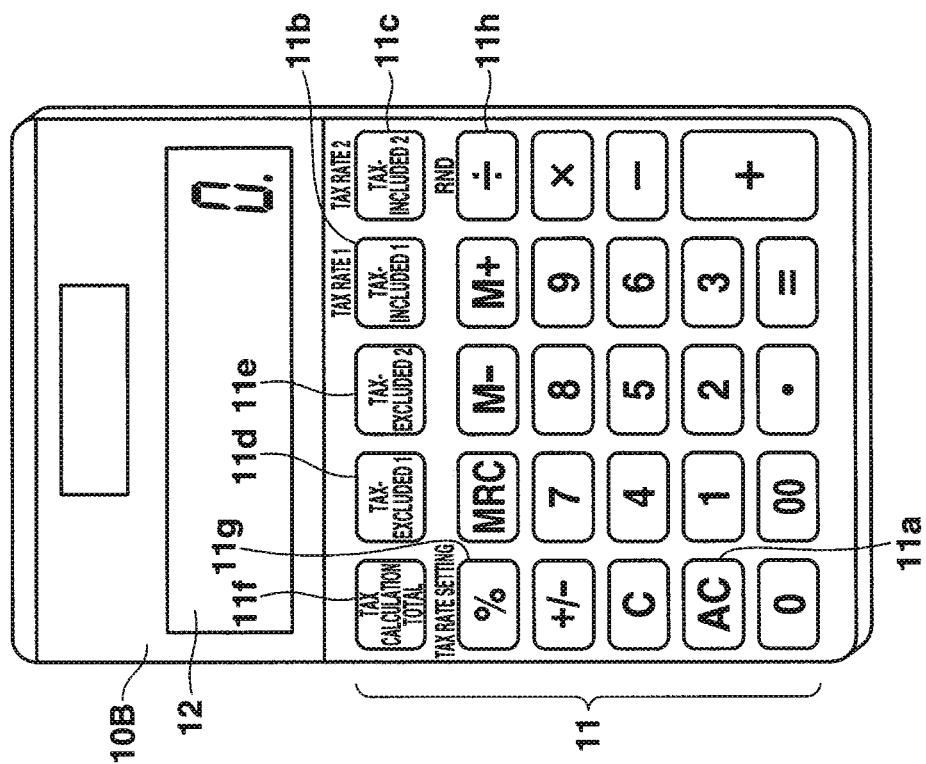
FIG. 1A and FIG. 1B are front views illustrating the configurations of the external appearances of tax calculators according to an embodiment.
Figure 1B:
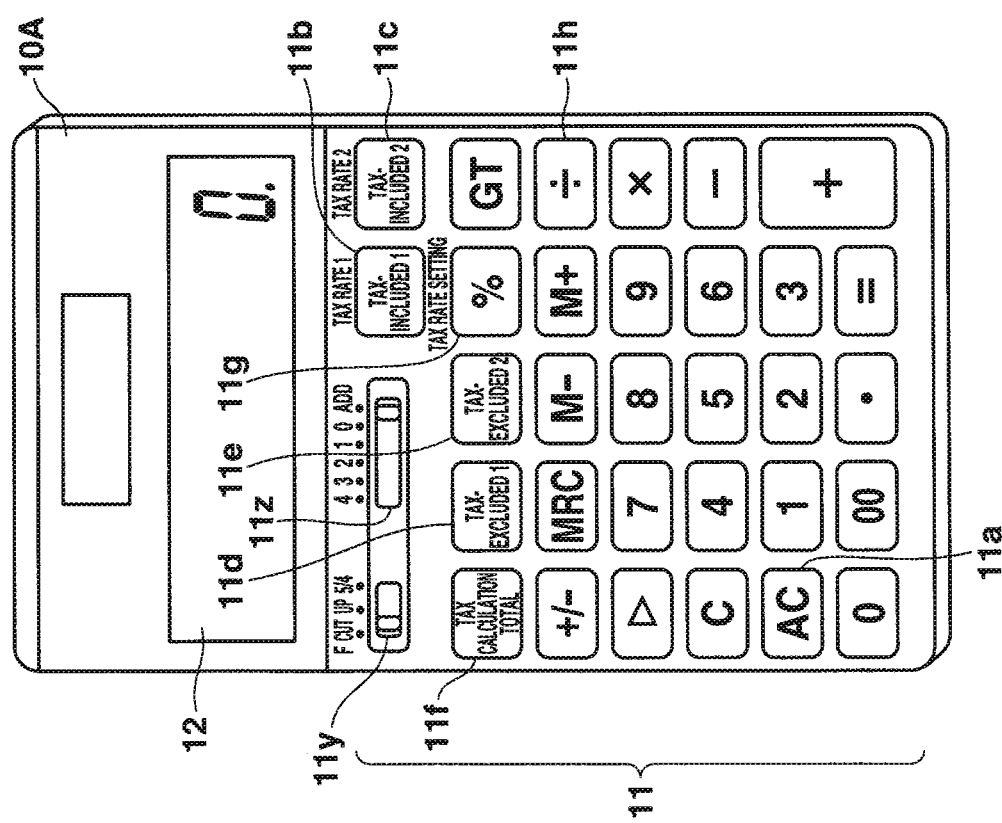

FIG. 1A and FIG. 1B are front views illustrating the configurations of the external appearances of tax calculators according to an embodiment. In the present embodiment, the tax calculators are realized as electronic calculators 10A and 10B which are exclusively used for calculations.

In the meantime, the tax calculator may be configured as, aside from the electronic calculator 10A, 10B, a personal computer, a tablet computer, a smartphone, a mobile phone, a touch-panel PDA (personal digital assistants), an electronic book, a portable game console, etc., which include calculation functions (or in which calculation process programs are installed). Incidentally, a tax calculator, which is not equipped with such physical keys (buttons) as provided on the calculator 10, displays a software keyboard like the keys of the calculator 10, and executes a calculation process in response to a key operation on the software keyboard.

The calculators 10A and 10B illustrated in FIG. 1A and FIG. 1B can execute substantially the same process, with only the keys mounted on the housings being different. FIG. 1A illustrates a just-type calculator 10A, and FIG. 1B illustrates a mini-just-type calculator 10B. The electronic calculators 10A and 10B are different in that the calculator 10A is provided with a round selector 11$y$ for setting a fraction process (a rounding method of a numerical value), and a decimal point selector 11$z$.

The electronic calculator 10A illustrated in FIG. 1A is described. The calculator 10A in this embodiment is provided with a tax calculation function of performing tax calculations based on a plurality of tax rates (in the description below, two tax rates, namely a tax rate 1 (e.g. "10%") and a tax rate 2 (e.g. "8%")).

A key input unit 11 including a plurality of keys, and a display unit 12 are provided on a front surface of the housing of the calculator 10. The key input unit 11 is provided with numeric keys, arithmetic keys, tax calculation function keys, and function keys. The numeric keys include, for example, a plurality of keys corresponding to [00], [0] ~[9]. The arithmetic keys include, for example, a plurality of keys corresponding to an [+] (addition) key, a [−] (subtraction) key, [×] (multiplication) key, a [÷] (division) key 11$h$, and an [=] key. The tax calculation function keys include tax calculation keys (a tax-included 1 calculation key (first tax calculation key) 11$b$, a tax-included 2 calculation key (second tax calculation key) 11$c$, a tax-excluded 1 calculation key (fourth tax calculation key) 11$d$, a tax-excluded 2 calculation key (fifth tax calculation key) 11$e$), and a tax calculation total key (third tax calculation key) 11$f$. The function keys include, for example, an all-clear key ([AC] key 11$a$), a clear key ([C] key), a plurality of memory keys ([MC], [MR], [M−], [M+]), a grand total key ([GT] key), a root key (√) key), and a [%] key.

The round selector 11$y$ sets a calculation method of a fraction process. For example, "F" setup designates display of a maximum number of digits including digits after the decimal point, which can be displayed on the display unit 12. "CUT" setup designates cut-off of a digit designated by the decimal point selector 11$z$. "UP" setup designates round-up of a digit designated by the decimal point selector 11$z$. "5/4" setup designates round-off of a digit designated by the decimal point selector 11$z$. The decimal point selector 11$z$ sets how many digits after the decimal point are displayed on the display unit. In the meantime, "ADD" setup designates setting of a decimal point to a predetermined number of digits for an input numerical value.

The display unit 12 is composed of a dot-matrix-type liquid crystal display unit. A numerical value, which is input by an operation on the key of the key input unit 11, is displayed on the display unit 12. A numerical value of a limited number of rows (e.g. one row) is displayed on the display unit 12. In addition, characters and symbols, which indicate a currently set calculation mode and various setting states, are displayed on a state display area provided along a side of the display unit 12.

The calculator 10B illustrated in FIG. 1B is provided with keys to which the same functions as in the calculator 10A illustrated in FIG. 1A are allocated. The keys, to which the same functions as in the calculator 10A illustrated in FIG. 1A are allocated, are denoted by the same reference numerals, and a description thereof is omitted.

Figure 2:
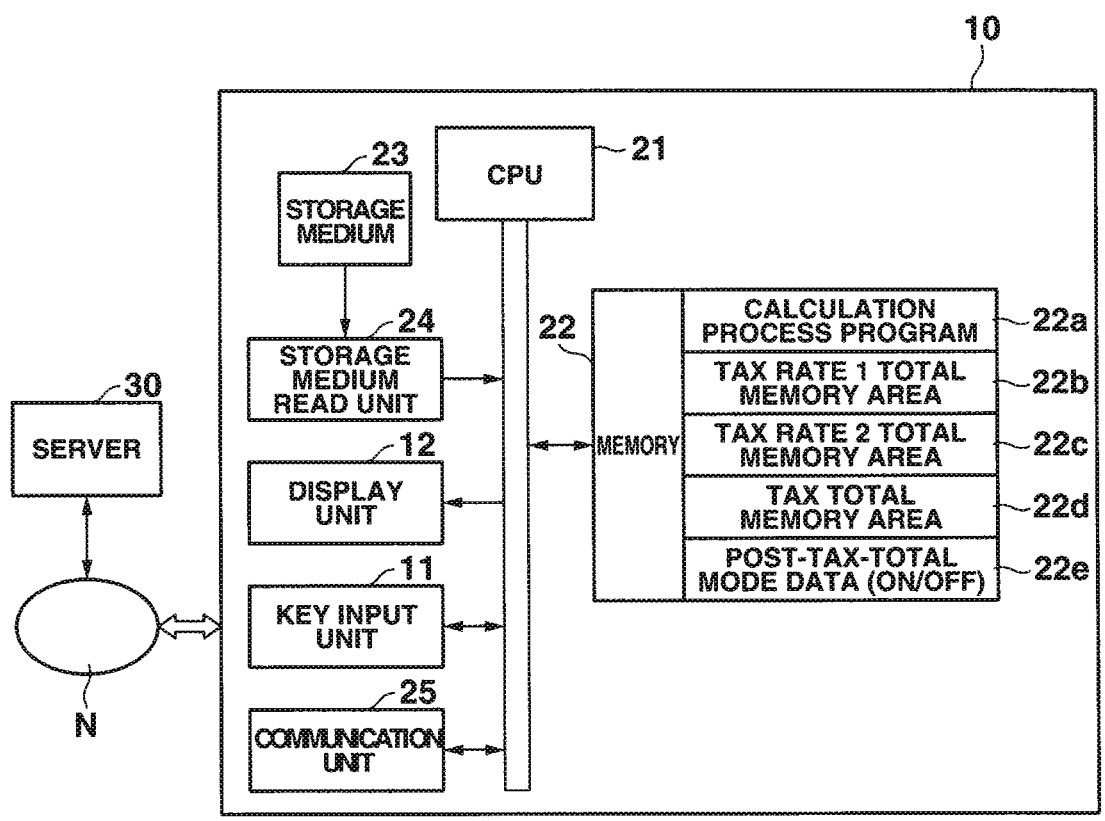
FIG. 2 is a block diagram illustrating the configuration of electronic circuitry of an electronic calculator in the embodiment.

FIG. 2 is a block diagram illustrating the configuration of electronic circuitry of the electronic calculator 10 (calculator 10A, 10B) in the present embodiment. The electronic circuitry of the calculator 10 includes a plurality of units including a CPU 21, which constitute a computer.

The CPU 21 controls the operations of the respective circuitry components by executing a calculation process program 22$a$ which is stored in a memory 22. If an input operation is executed, the CPU 21 detects a key on which the input operation was executed, based on a key input signal from the key input unit 11, and the CPU 21 executes various calculation processes corresponding to keys which were detected. In the calculator 10, the CPU 21 controls the operations of the respective circuitry components in accordance with instructions described in the calculation process program 22$a$, and software and hardware cooperatively operate to realize calculation processes including a process by a calculation function which will be described below in the operational explanation.

The calculation process program 22$a$ may be prestored in the memory 22, or may be read in from an external storage medium 23, such as a memory card, via a storage medium read unit 24, or may be downloaded from a server 30 on a communication network N (including the Internet, etc.) via a communication unit 25.

The memory 22 includes, as well as an area storing the calculation process program 22$a$, a tax rate 1 total memory area 22$b$, a tax rate 2 total memory area 22$c$, a tax total memory area 22$d$, and an area storing various data such as post-tax-total mode data 22$e$.

The tax rate 1 total memory area 22$b$ is an area for storing data which is calculated by a tax calculation based on the tax rate 1. The tax rate 1 total memory area 22$b$ stores a tax-included amount (first tax-included amount) and a tax amount (first tax amount) which were calculated by using the tax rate 1, and a tax-excluded amount (first tax-excluded amount) with respect to at least one numerical value indicating a tax-excluded amount (first tax-excluded amount) which was input by an input operation of the key input unit 11. (Alternatively, the tax rate 1 total memory area 22$b$ stores a total of a plurality of numerical values indicating tax-excluded amounts (first tax-excluded amounts) which were input by input operations of the key input unit 11, a total a plurality of tax-included amounts (first tax-included amounts) which were calculated by using the tax rate 1 with respect to the input tax-excluded amounts (first tax-excluded amounts), a total of a plurality of tax amounts (first tax amounts), and a total of a plurality of tax-excluded amounts (first tax-excluded amounts).)

The tax rate 2 total memory area 22$c$ is an area for storing data which is calculated by a tax calculation based on the tax rate 2. The tax rate 2 total memory area 22$c$ stores a tax-included amount (second tax-included amount) and a tax amount (second tax amount) which were calculated by using the tax rate 2, and a tax-excluded amount (second tax-excluded amount) with respect to at least one numerical value indicating a tax-excluded amount (second tax-excluded amount) which was input by an input operation of the key input unit 11. In addition, the tax rate 2 total memory area 22c stores a second tax-included total amount indicating a total of second tax-included amounts corresponding to at least one numerical value, a second tax-excluded total amount corresponding to the second tax-included total amount, and a second tax total amount corresponding to the second tax-included total amount. (Alternatively, the tax rate 2 total memory area 22c stores a total of a plurality of numerical values indicating tax-excluded amounts (second tax-excluded amounts) which were input by input operations of the key input unit 11, a total of a plurality of tax-included amounts (second tax-included amounts) which were calculated by using the tax rate 2 with respect to the input tax-excluded amounts (second tax-excluded amounts), a total of a plurality of tax amounts (second tax amounts), and a total of a plurality of tax-excluded amounts (second tax-excluded amounts).)

The tax total memory area 22d is an area for storing data indicating the total of the numerical value, which is calculated by the tax calculation based on the tax rate 1, and the numerical value, which is calculated by the tax calculation based on the tax rate 2. The tax total memory area 22d stores, in response to an input operation of the tax calculation total key 11f, a tax-included grand total amount in which the first tax-included total amount and the second tax-included total amount are added, a tax-excluded grand total amount corresponding to the tax-included grand total amount, and a tax grand total amount corresponding to the tax-included grand total amount.

The post-tax-total mode data 22e is data indicating whether the current state is a state after the tax grand total amount was calculated in response to the input operation of the tax calculation total key 11f (post-tax-total mode ON/OFF). The post-tax-total mode is set in the ON state when the tax-included grand total amount was calculated, and the post-tax-total mode is set in the OFF state when a key other than the tax-included 1 calculation key 11b and tax-included 2 calculation key 11c, for instance, [AC] key 11a, was operated, or when a new numerical value was input by the operation of a numeric key. When the post-tax-total mode is in the ON state (the state after the tax-included grand total amount was calculated), if the tax-included 1 calculation key 11b or tax-included 2 calculation key 11c is operated, the (first/second) tax-included total amount is displayed (tax-included total amount display control process). Then, each time the same key (the tax-included 1 calculation key 11b or tax-included 2 calculation key 11c) is operated, the tax-excluded total amount corresponding to the (first/second) tax-included total amount, and the tax total amount corresponding to the (first/second) tax-included total amount are successively displayed in a switched manner. In addition, when the post-tax-total mode is in the OFF state (i.e. not in the state after the tax-included grand total amount was calculated), if the tax-included 1 calculation key 11b or tax-included 2 calculation key 11c is operated, the (first/second) tax-included amount in a case in which a tax-excluded amount was set as a displayed numerical value is displayed (tax-included amount display control process). Then, if the same key (the tax-included 1 calculation key 11b or tax-included 2 calculation key 11c) is operated, the (first/second) tax amount is displayed.

Figure 3:
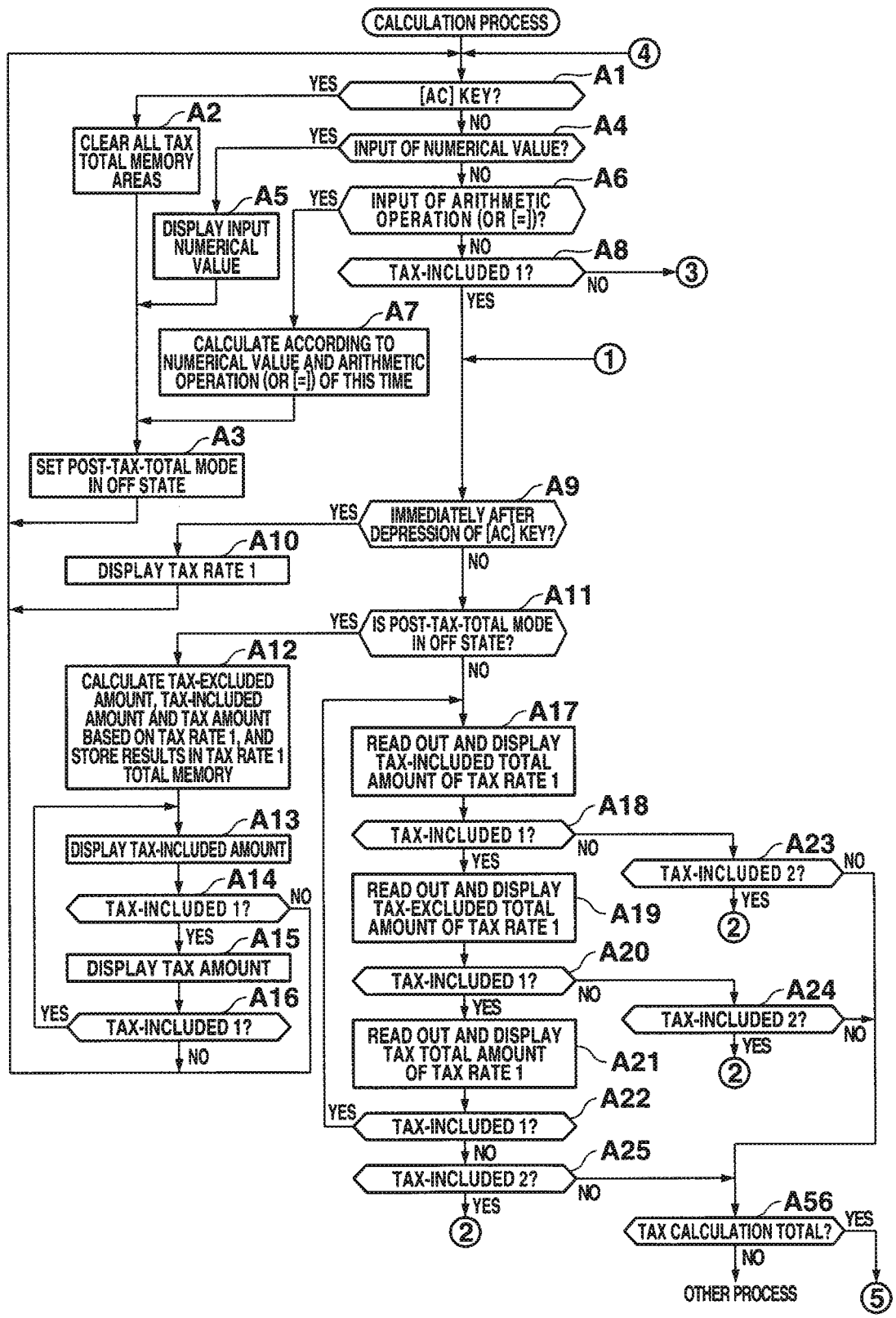
FIG. 3 is a flowchart for describing an operation of a tax calculation function of the electronic calculator in the embodiment.
Figure 4:
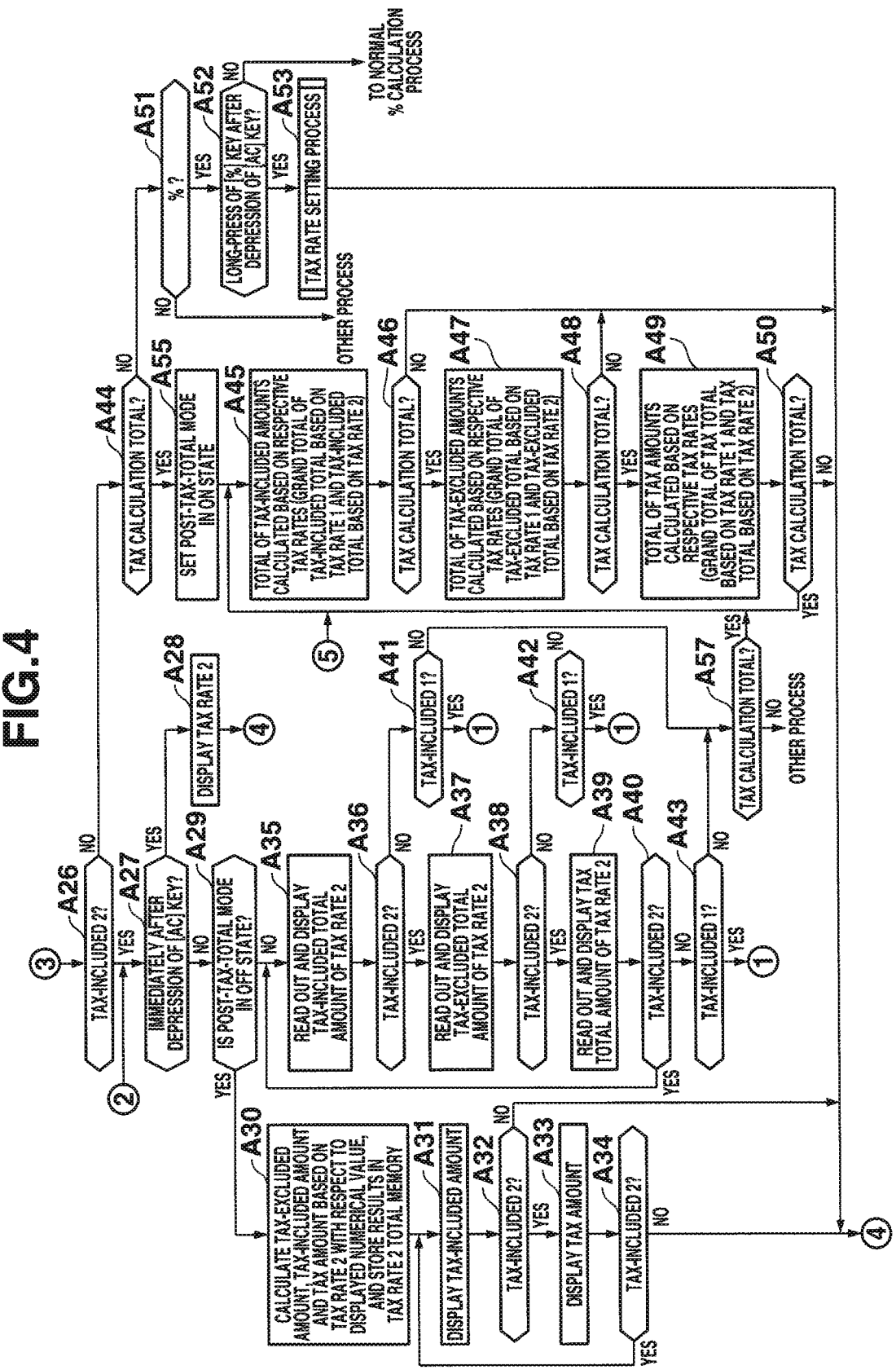
FIG. 4 is a flowchart for describing the operation of the tax calculation function of the electronic calculator in the embodiment.
Figures 5, 6:
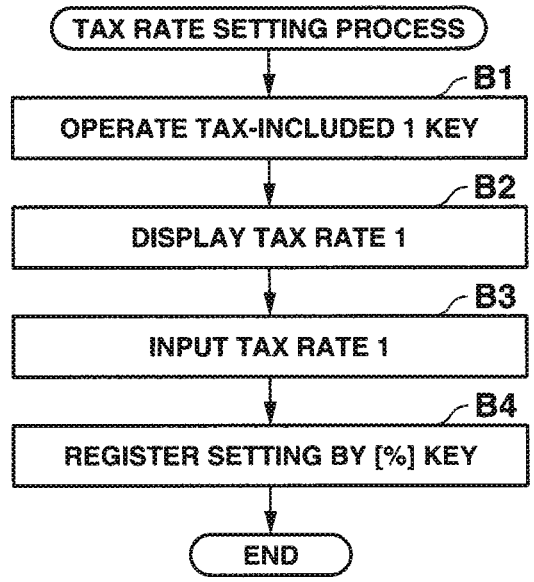
FIG. 5 is a flowchart for describing the operation of the tax calculation function of the electronic calculator in the embodiment.
FIG. 6 is a view illustrating concrete examples of input operations and display for describing the tax calculation function of the electronic calculator in the embodiment.

Next, the operation of the electronic calculator 10 in this embodiment is described. FIG. 3, FIG. 4 and FIG. 5 are flowcharts for describing the operation of the tax calculation function of the electronic calculator 10 in the embodiment. FIG. 6, FIG. 7, FIG. 8A, FIG. 8B, FIG. 8C, FIG. 9 and FIG. 10 are views illustrating concrete examples of input operations and display for describing the tax calculation function of the electronic calculator 10 in the embodiment.

To start with, in order to clear the display before starting a calculation, the user operates (depresses) the [AC] key 11a. If the [AC] key 11a is operated (step A1, Yes), the CPU 21 clears each of the areas of the memory 22, which are used for tax calculation, that is, all of the tax rate 1 total memory area 22b, tax rate 2 total memory area 22c and tax total memory area 22d (step A2). In addition, the CPU 21 sets the post-tax-total mode, which is stored in the post-tax-total mode data 22e, in the OFF state (step A3). Part (A1) of FIG. 7 illustrates a display example in a case in which the [AC] key 11a was operated. In addition, when the [AC] key 11a was operated in the state in which a numerical value of a previous tax calculation result or the like was displayed as illustrated in part (A1) of FIG. 8A, the CPU 21 clears the previously displayed numerical value and displays "0", as illustrated in part (A2) of FIG. 8A.

If an input operation on the tax-included 1 calculation key 11b is detected immediately after the input operation of the [AC] key 11a (step A8, A9, Yes), the CPU 21 causes the display unit 12 to display the tax rate 1 which is set for the tax-included 1 calculation key 11b (step A10). In the present embodiment, in the default setting, "10%" is set as the tax rate 1. Similarly, if an input operation on the tax-included 2 calculation key 11c is detected immediately after the input operation of the [AC] key 11a (step A26, A27, Yes), the CPU 21 causes the display unit 12 to display the tax rate 2 which is set for the tax-included 2 calculation key 11c (step A28). In the present embodiment, in the default setting, "8%" is set as the tax rate 2.

Next, if a numeric key is operated by the user in order to input a numerical value that is a target of calculation (step A4, Yes), the CPU 21 inputs a numerical value (numerical value code) corresponding to the input-operated numeric key, and causes the display unit 12 to display the input numerical value (step A5). In addition, the CPU 21 sets the post-tax-total mode, which is stored in the post-tax-total mode data 22e, in the OFF state (step A3). Subsequently, if an arithmetic key is operated (step A6, Yes), the CPU 21 inputs an arithmetic operation (arithmetic code) corresponding to the input-operated arithmetic key, and displays the arithmetic (sign) symbol of the input arithmetic operation on the state display area of the display unit 12 (step A7). In addition, the CPU 21 sets the post-tax-total mode, which is stored in the post-tax-total mode data 22e, in the OFF state (step A3). Furthermore, the CPU 21 executes an arithmetic operation, based on the input arithmetic code and the input numerical value code, and causes the display unit 12 to display a result during the arithmetic operation. Subsequently, in the same manner, by the repetition of the input of the numerical value code and arithmetic code, the CPU 21 successively stores the input numerical value codes and arithmetic codes. Then, if the "=" (equal) key is operated by the user operation, the CPU 21 inputs an arithmetic code corresponding to the input-operated arithmetic key ("=" key), executes a calculation corresponding to the numerical value codes and arithmetic code ("=" code) which have been input thus far, and causes the display unit 12 to display the calculation result (steps A4 to A7).

Thus, in the state in which the numerical value is displayed on the display unit 12, if the input operation of the tax-included 1 calculation key 11b or tax-included 2 calculation key 11c is detected, the CPU 21 executes a tax calculation based on the tax rate corresponding to the input-operated tax calculation key, with respect to the numerical value indicating the tax-excluded amount displayed on the display unit 12. In the meantime, in the above description, the numerical value displayed on the display unit 12 is input (displayed) by the arithmetic operation. However, a numerical value, which was simply input by an input operation of a numeric key, can be set as a target of the tax calculation.

For example, if the CPU 21 detects an input operation of the tax-included 1 calculation key 11*b* (step A8, Yes), since the post-tax-total mode is in the OFF state (step A11, Yes), the CPU 21 calculates a tax-included amount and a tax amount, based on the tax rate 1 (e.g. "10%"), with respect to the displayed numerical value that is the target of the tax calculation, and stores the tax-included amount and tax amount, together with the tax-excluded amount indicated by the displayed numerical value, in the tax rate 1 total memory area 22*b* (step A12). In addition, the CPU 21 causes the display unit 12 to display the tax-included amount that was calculated based on the tax rate 1 (step A13). Similarly, in the state in which a numerical value input by the operation of a numeric key (or a numerical value calculated by an arithmetic operation) is displayed on the display unit 12 (steps A4 to A7), if the CPU 21 detects an input operation of the tax-included 1 calculation key 11*b* (step A8, Yes), the CPU 21 executes a tax calculation based on the tax rate 1, with respect to the displayed numerical value that is displayed on the display unit 12, stores the calculation result in the tax rate 1 total memory area 22*b*, and causes the display unit 12 to display the tax amount (steps A8 to A13). Specifically, tax calculations for a plurality of numerical values can be successively instructed.

In addition, if the CPU 21 detects an input operation of the tax-included 2 calculation key 11*c* (step A26, Yes), since the post-tax-total mode is in the OFF state (step A29, Yes), the CPU 21 calculates a tax-included amount and a tax amount, based on the tax rate 2 (e.g. "8%"), with respect to the displayed numerical value that is the target of the tax calculation, and stores the tax-included amount and tax amount, together with the tax-excluded amount indicated by the displayed numerical value, in the tax rate 2 total memory area 22*c* (step A30). In addition, the CPU 21 causes the display unit 12 to display the tax-included amount that was calculated based on the tax rate 2 (step A31). Similarly, in the state in which a numerical value input by the operation of a numeric key (or a numerical value calculated by an arithmetic operation) is displayed on the display unit 12 (steps A4 to A7), if the CPU 21 detects an input operation of the tax-included 2 calculation key 11*c* (step A26, Yes), the CPU 21 executes a tax calculation based on the tax rate 2, with respect to the displayed numerical value that is displayed on the display unit 12, stores the calculation result in the tax rate 2 total memory area 22*c*, and causes the display unit 12 to display the tax amount (steps A26 to A30).

Next, concrete examples of the input of numerical values and the tax calculation will be described. FIG. 6 is a view illustrating concrete examples of input numerical values (tax-excluded amounts), tax-included amounts and tax amounts, which are used in the description below. Part (B1) of FIG. 7 to part (B7) of FIG. 7 illustrate the state in which a plurality of numerical values (tax-excluded amounts) shown in FIG. 6 were input, and the tax rates for these values were designated by the tax-included 1 calculation key 11*b* or tax-included 2 calculation key 11*c*.

For example, as illustrated in part (B1) of FIG. 7, if the tax-included 1 calculation key 11*b* is operated after a numerical value "1000" was input, the CPU 21 displays a tax-included amount "1100" which was calculated based on the tax rate 1. In addition, the CPU 21 displays a symbol "Tax 1" which indicates that the tax amount calculated based on the tax rate 1 is displayed. Similarly, if numerical values "200", "5000" and "1500" are input and the tax-included 1 calculation key 11*b* is input for each of these numerical values, the CPU 21 displays tax-included amounts calculated based on the tax rate 1 with respect to these numerical values, as illustrated in part (B2) of FIG. 7 to part (B4) of FIG. 7. The results of tax calculations for the respective numerical values are stored in the tax rate 1 total memory area 22*b*.

In addition, for example, as illustrated in part (B5) of FIG. 7, if the tax-included 2 calculation key 11*c* is operated after a numerical value "2000" was input, the CPU 21 displays a tax-included amount "2160" which was calculated based on the tax rate 2. In addition, the CPU 21 displays a symbol "Tax 2" which indicates that the tax amount calculated based on the tax rate 2 is displayed. Similarly, if numerical values 3000" and "400" are input and the tax-included 2 calculation key 11*c* is input for each of these numerical values, the CPU 21 displays tax-included amounts calculated based on the tax rate 2 with respect to these numerical values, as illustrated in part (B6) of FIG. 7 and part (B7) of FIG. 7. The results of tax calculations for the respective numerical values are stored in the tax rate 2 total memory area 22*c*.

In this manner, the calculator 10 of this embodiment can arbitrarily designate the tax rate which is used for the tax calculation for the input numerical value, by the operation of either the tax-included 1 calculation key 11*b* or the tax-included 2 calculation key 11*c*. Accordingly, for example, when the tax-included grand total amount of plural commodities with different applied tax rates is calculated, the tax-included amounts can be input by individually designating the tax rates with respect to the plural commodities with different applied tax rates. Thus, an input work can easily be performed. In part (B1) of FIG. 7 to part (B7) of FIG. 7, the tax calculations for the numerical values, to which the tax rate 1 is applied, and the tax calculations for the numerical values, to which the tax rate 2 is applied, are successively executed. However, it is possible to execute tax calculations by designating the tax rate 1 and tax rate 2 in a mixed manner.

In the meantime, in the state in which the tax-included amount is displayed, if the key (tax-included 1 calculation key 11*b* or tax-included 2 calculation key 11*c*), which was operated in order to designate the tax calculation, is successively operated, the tax-included amount display is changed to tax-amount display. For example, when the tax-included amount calculated based on the tax rate 1 is displayed (step A13), if the tax-included 1 calculation key 11*b* is operated (step A14, Yes), the CPU 21 reads out the tax amount, which was calculated based on the tax rate 1, from the tax rate 1 total memory area 22*b*, and displays the read-out tax amount (step A15). Furthermore, if the tax-included 1 calculation key 11*b* is successively operated (step A16, Yes), the CPU 21 displays the tax-included amount calculated based on the tax rate 1. Besides, when the tax-included amount calculated based on the tax rate 2 is displayed (step A31), if the tax-included 2 calculation key 11*c* is operated (step A32, Yes), the CPU 21 reads out the tax amount, which was calculated based on the tax rate 2, from the tax rate 2 total memory area 22*c*, and displays the read-out tax amount (step A33). Furthermore, if the tax-included 2 calculation key 11*c* is successively operated (step A34, Yes), the CPU 21 displays the tax-included amount calculated based on the tax rate 2 (step A31). Specifically, after the calculator 10 calculated the tax-included amount in response to the operation of the tax-included 1 calculation key 11*b* or tax-included 2 calculation key 11c, the calculator 10 can alternately display the tax-included amount and the tax amount, each time the tax-included 1 calculation key 11b or tax-included 2 calculation key 11c is operated. Therefore, the tax-included amount and the tax amount can easily be confirmed.

Next, in the state in which the tax-included amount or tax amount is displayed, if the tax calculation total key 11f (third tax calculation key) is operated (step A44, Yes), the CPU 21 sets the post-tax-total mode, which is stored in the post-tax-total mode data 22e, in the ON state (step A55). In addition, the CPU 21 calculates a tax-included grand total amount in which a total (first tax-included total amount) of the tax-included amount, which was calculated based on the tax rate 1 stored in the tax rate 1 total memory area 22b, and a total (second tax-included total amount) of the tax-included amount, which was calculated based on the tax rate 2 stored in the tax rate 2 total memory area 22c, are added, and the CPU 21 stores the tax-included grand total amount in the tax total memory area 22d, and causes the display unit 12 to display the tax-included grand total amount (step A45).

In addition, by successively operating the tax calculation total key 11f in the state in which the tax-included grand total amount is displayed, the calculator 10 can successively display a tax-excluded grand total amount and a tax grand total amount in a switched manner (tax-excluded/tax total amount display control process).

When the tax-included grand total amount is displayed (step A45), if the tax calculation total key 11f (third tax calculation key) is operated (step A46, Yes), the CPU 21 calculates a tax-excluded grand total amount corresponding to the tax-included grand total amount, based on the data stored in the tax rate 1 total memory area 22b and tax rate 2 total memory area 22c, and stores the tax-excluded grand total amount in the tax total memory area 22d. In addition, the CPU 21 reads out the tax-excluded grand total amount from the tax total memory area 22d, and displays the tax-excluded grand total amount (step A47).

Furthermore, when the tax-excluded grand total amount is displayed (step A47), if the tax calculation total key 11f (third tax calculation key) is operated (step A48, Yes), the CPU 21 calculates a tax grand total amount corresponding to the tax-included grand total amount, based on the data stored in the tax rate 1 total memory area 22b and tax rate 2 total memory area 22c, and stores the tax grand total amount in the tax total memory area 22d. In addition, the CPU 21 reads out the tax grand total amount from the tax total memory area 22d, and displays the tax grand total amount (step A49).

If the tax calculation total key 11f is further operated, the CPU 21 displays the tax-included grand total amount on the display unit 12. Specifically, after the calculator 10 calculated the tax-included grand total amount in response to the operation of the tax calculation total key 11f, the calculator 10 can alternately switch the display of the tax-included grand total amount, the display of the tax-excluded grand total amount corresponding to the tax-included grand total amount, and the display of the tax grand total amount corresponding to the tax-included grand total amount, each time the tax calculation total key 11f is operated. Therefore, the tax-included grand amount, the tax-excluded grand total amount and the tax grand total amount can easily be confirmed.

Part (C1) of FIG. 7 to part (C3) of FIG. 7 illustrate display examples in the case in which the tax calculation total key 11f (third tax calculation key) was operated. After the tax calculations were executed for the plural numerical values illustrated in part (B1) of FIG. 7 to part (B7) of FIG. 7, if the tax calculation total key 11f is operated, the CPU 21 displays, as illustrated in part (C1) of FIG. 7, a tax-included grand total amount "14302" which indicates the grand total amount of the tax-included amounts to which the tax rate 1 and tax rate 2 were applied. Here, if the tax calculation total key 11f is operated, the CPU 21 displays a tax-excluded grand total amount "13100", as illustrated in part (C2) of FIG. 7. If the tax calculation total key 11f is further operated, the CPU 21 displays a tax grand total amount "1202", as illustrated in part (C3) of FIG. 7 (tax-excluded/tax total amount display control process). Moreover, if the tax calculation total key 11f is operated, the CPU 21 returns to the display of part (C1) of FIG. 7, and displays the tax-included grand total amount "14302".

Next, a description is given of the case in which the tax-included 1 calculation key 11b or tax-included 2 calculation key 11c is operated after the post-tax-total mode was set in the ON state (after the tax-included grand total amount was calculated).

In the state in which the tax-included grand total amount, tax-excluded grand total amount or tax grand total amount is displayed as illustrated in part (C1) of FIG. 7 to part (C3) of FIG. 7, if the tax-included 1 calculation key 11b is operated (step A8, Yes), the post-tax-total mode is in the ON state (step A11, No). Thus, the CPU 21 reads out the first tax-included total amount, which indicates the total of the first tax-included amount corresponding to at least one numerical value, from the tax rate 1 total memory area 22b, and causes the display unit 12 to display the first tax-included total amount (step A17). Further, in the state in which the first tax-included total amount is displayed (step A17), if the tax-included 1 calculation key 11b is operated (step A18, Yes), the CPU 21 reads out the first tax-excluded total amount, which corresponds to the first tax-included total amount, from the tax rate 1 total memory area 22b, and causes the display unit 12 to display the first tax-excluded total amount (step A19). Moreover, in the state in which the first tax-excluded total amount is displayed, if the tax-included 1 calculation key 11b is operated (step A20, Yes), the CPU 21 reads out the first tax total amount, which corresponds to the first tax-included total amount, from the tax rate 1 total memory area 22b, and causes the display unit 12 to display the first tax total amount (step A21). Specifically, after the calculator 10 calculated the tax-included grand total amount, the calculator 10 can switch the display to any one of the display of the first tax-included total amount which was calculated based on the tax rate 1, the display of the first tax-excluded total amount and the display of the first tax total amount, each time the tax-included 1 calculation key 11b is operated. Therefore, the first tax-included total amount, the first tax-excluded total amount and the first tax total amount can easily be confirmed.

Part (D1) of FIG. 7 to part (D3) of FIG. 7 illustrate display examples in the case in which the tax-included 1 calculation key 11b was operated. In the state of the display of Part (C1) of FIG. 7 to part (C3) of FIG. 7, if the tax-included 1 calculation key 11b is operated, the CPU 21 displays, as illustrated in part (D1) of FIG. 7, a first tax-included total amount "8470" which was calculated based on the tax rate 1. Here, if the tax-included 1 calculation key 11b is operated, the CPU 21 displays a first tax-excluded total amount "7700", as illustrated in part (D2) of FIG. 7. If the tax-included 1 calculation key 11b is further operated, the CPU 21 displays a first tax total amount "770", as illustrated in part (D3) of FIG. 7. Moreover, if the tax-included 1 calculation key 11b is operated, the CPU 21 returns to the display of part (D1) of FIG. 7, and displays the first tax-included total amount "8470".

In the meantime, when the tax-included 2 calculation key 11c was operated in the display state of Part (C1) of FIG. 7 to part (C3) of FIG. 7 (step A23, A24, A25, Yes), the CPU 21 effects switching to the display of the second tax-included total amount illustrated in part (E1) of FIG. 7 to part (E3) of FIG. 7, which will be described below (step A35). In addition, in the display state of part (D1) of FIG. 7 to part (D3) of FIG. 7, if the tax calculation total key 11f is operated (step A56, Yes), the CPU 21 transitions to the above-described display state of the tax-included grand total amount (step A45).

On the other hand, in the state in which the tax-included grand total amount, tax-excluded grand total amount or tax grand total amount is displayed as illustrated in part (C1) of FIG. 7 to part (C3) of FIG. 7, if the tax-included 2 calculation key 11c is operated (step A26, Yes), the post-tax-total mode is in the ON state (step A29, No). Thus, the CPU 21 reads out the second tax-included total amount, which indicates the total of the second tax-included amount corresponding to at least one numerical value, from the tax rate 2 total memory area 22c, and causes the display unit 12 to display the second tax-included total amount (step A35). Further, in the state in which the second tax-included total amount is displayed (step A35), if the tax-included 2 calculation key 11c is operated (step A36, Yes), the CPU 21 reads out the second tax-excluded total amount, which corresponds to the second tax-included total amount, from the tax rate 2 total memory area 22c, and causes the display unit 12 to display the second tax-excluded total amount (step A37). Moreover, in the state in which the second tax-excluded total amount is displayed, if the tax-included 2 calculation key 11c is operated (step A38, Yes), the CPU 21 reads out the second tax total amount, which corresponds to the second tax-included total amount, from the tax rate 2 total memory area 22c, and causes the display unit 12 to display the second tax total amount (step A39). Specifically, after the calculator 10 calculated the tax-included grand total amount, the calculator 10 can switch the display to any one of the display of the second tax-included total amount which was calculated based on the tax rate 2, the display of the second tax-excluded total amount and the display of the second tax total amount, each time the tax-included 2 calculation key 11c is operated. Therefore, the second tax-included total amount, the second tax-excluded total amount and the second tax total amount can easily be confirmed.

Part (E1) of FIG. 7 to part (E3) of FIG. 7 illustrate display examples in the case in which the tax-included 2 calculation key 11c was operated. In the state of the display of Part (C1) of FIG. 7 to part (C3) of FIG. 7, if the tax-included 2 calculation key 11c is operated, the CPU 21 displays, as illustrated in part (E1) of FIG. 7, a second tax-included total amount "5832" which was calculated based on the tax rate 2. Here, if the tax-included 2 calculation key 11c is operated, the CPU 21 displays a second tax-excluded total amount "5400", as illustrated in part (E2) of FIG. 7. If the tax-included 2 calculation key 11c is further operated, the CPU 21 displays a second tax total amount "432", as illustrated in part (E3) of FIG. 7. Moreover, if the tax-included 2 calculation key 11c is operated, the CPU 21 returns to the display of part (E1) of FIG. 7, and displays the second tax-included total amount "5832".

In the meantime, when the tax-included 1 calculation key 11b was operated in the display state of Part (E1) of FIG. 7 to part (E3) of FIG. 7 (step A41, A42, A43, Yes), the CPU 21 effects switching to the display of the first tax-included total amount illustrated in part (D1) of FIG. 7 to part (D3) of FIG. 7 (step A17). In addition, in the display state of part (E1) of FIG. 7 to part (E3) of FIG. 7, if the tax calculation total key 11f is operated (step A57, Yes), the CPU 21 transitions to the above-described display state of the tax-included grand total amount (step A45).

Specifically, during the ON state of the post-tax-total mode, the calculator 10 can alternately display, in a switched manner, the total displays (part (D1) of FIG. 7 to part (D3) of FIG. 7, and part (E1) of FIG. 7 to part (E3) of FIG. 7) corresponding to the tax rate 1 and tax rate 2, by the simple operations of the tax-included 1 calculation key 11b and tax-included 2 calculation key 11c. In addition, by the operation of the tax calculation total key 11f, the calculator 10 can switch the display to the grand total display (part (C1) of FIG. 7 to part (C3) of FIG. 7).

Thus, in the calculator 10 of this embodiment, the tax calculations based on the plural tax rates can be executed by the simple operations using the tax-included 1 calculation key 11b and tax-included 2 calculation key 11c corresponding to the plural tax rates, and the contents of the tax calculations can easily be confirmed.

Next, a description is given of a tax rate setting process of setting tax rates for the tax-included 1 calculation key 11b and tax-included 2 calculation key 11c. In the above description, it is assumed that "10%" is initially set as the tax rate 1 for the tax-included 1 calculation key 11b, and "8%" is initially set as the tax rate 2 for the tax-included 2 calculation key 11c. In the calculator 10 of this embodiment, tax rates can arbitrarily be set for the tax-included 1 calculation key 11b and tax-included 2 calculation key 11c.

For example, after the operation of the [AC] key 11a (step A1), if an operation of long-pressing, for instance, the [%] key 11g (an operation of long-pressing the [%] key 11g, for example, for three seconds) is executed (step A51, A52), the CPU 21 starts the tax rate setting process.

Figure 8A:
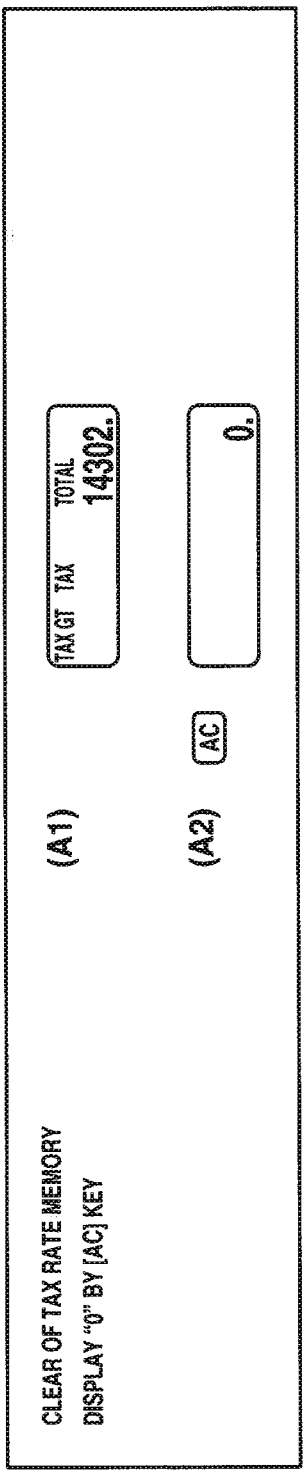
FIG. 8A, FIG. 8B and FIG. 8C are views illustrating concrete examples of input operations and display for describing the tax calculation function of the electronic calculator in the embodiment.
Figure 8B:
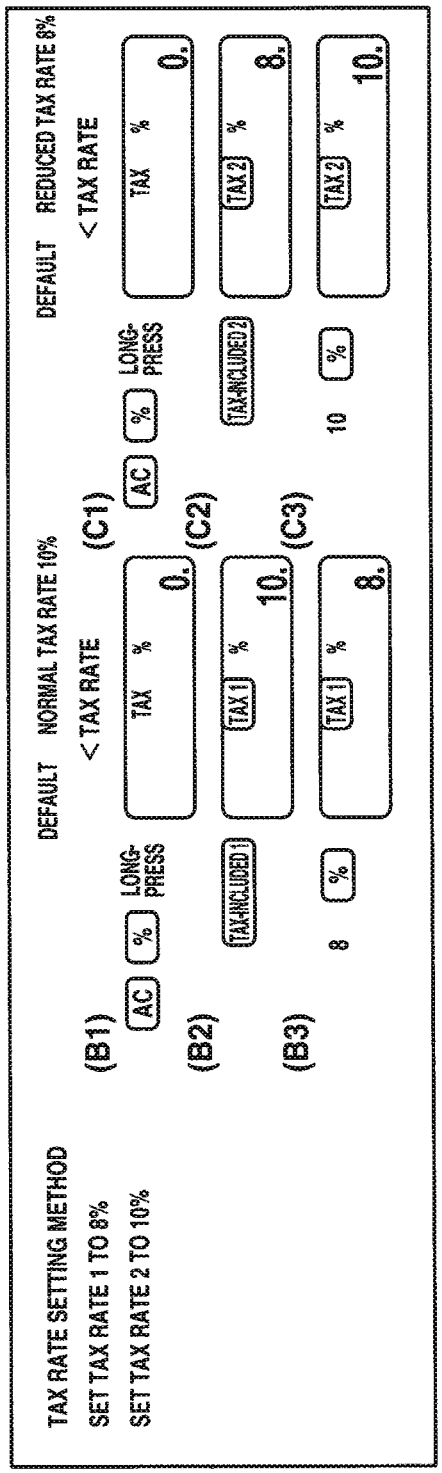

FIG. 5 is a flowchart for describing the tax rate setting operation in the embodiment. FIG. 8B is a view illustrating a display example at the time of the tax rate setting operation. To begin with, the case of changing the setting of the tax rate 1 is described.

If the CPU 21 starts the tax rate setting process by the operation of the [AC] key 11a and [%] key 11g, the CPU 21 displays a screen for tax rate setting, as illustrated in part (B1) of FIG. 8B. Here, if the tax-included 1 calculation key 11b is operated (step B1), the CPU 21 causes the display unit 12 to display the tax rate 1 ("10"), which was set for the tax-included 1 calculation key 11b, and the symbol of "Tax 1", as illustrated in part (B2) of FIG. 8B (step B2). Next, after a numerical value (e.g. "8"), which indicates the tax rate 1 that is to be newly set, is input (step B3), if the [%] key 11g is operated, the CPU 21 causes the display unit 12 to display the input numerical value ("8") and sets (registers) (stores in the memory 22) the input numerical value as the tax rate 1 that is applied to the tax-included 1 calculation key 11b (step B4).

Similarly, after the CPU 21 starts the tax rate setting process as illustrated in part (C1) of FIG. 8B, if the tax-included 2 calculation key 11c is operated, the CPU 21 causes the display unit 12 to display the tax rate 2 ("8"), which is set for the tax-included 2 calculation key 11c, and the symbol of "Tax 2", as illustrated in part (C2) of FIG. 8B. Next, after a numerical value (e.g. "10"), which indicates the tax rate 2 that is to be newly set, is input, if the [%] key 11g is operated, the CPU 21 causes the display unit 12 to display the input numerical value ("10") and sets (registers) (stores in the memory 22) the input numerical value as the tax rate 2 that is applied to the tax-included 2 calculation key 11c.

In this manner, in the calculator 10 of this embodiment, arbitrary tax rates can be set for the tax-included 1 calculation key 11b and tax-included 2 calculation key 11c. In the above-described process of FIG. 3 and FIG. 4, if the tax-included 1 calculation key 11b or tax-included 2 calculation key 11c is operated, the CPU 21 executes the tax calculation by using the newly set (registered) tax rate 1, 2.

Figure 8C:
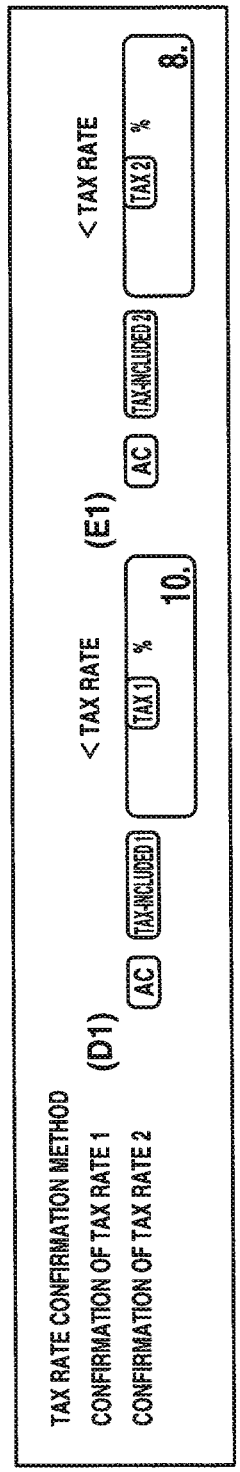

The tax rate 1, which was set (registered) for the tax-included 1 calculation key 11b, can be displayed, as illustrated in part (D1) of FIG. 8C, by operating the tax-included 1 calculation key 11b immediately after operating the [AC] key 11a, as described above (step A10). Similarly, the tax rate 2, which was set (registered) for the tax-included 2 calculation key 11c, can be displayed, as illustrated in part (E1) of FIG. 8C, by operating the tax-included 2 calculation key 11c immediately after operating the [AC] key 11a, as described above (step A28).

Figure 9:
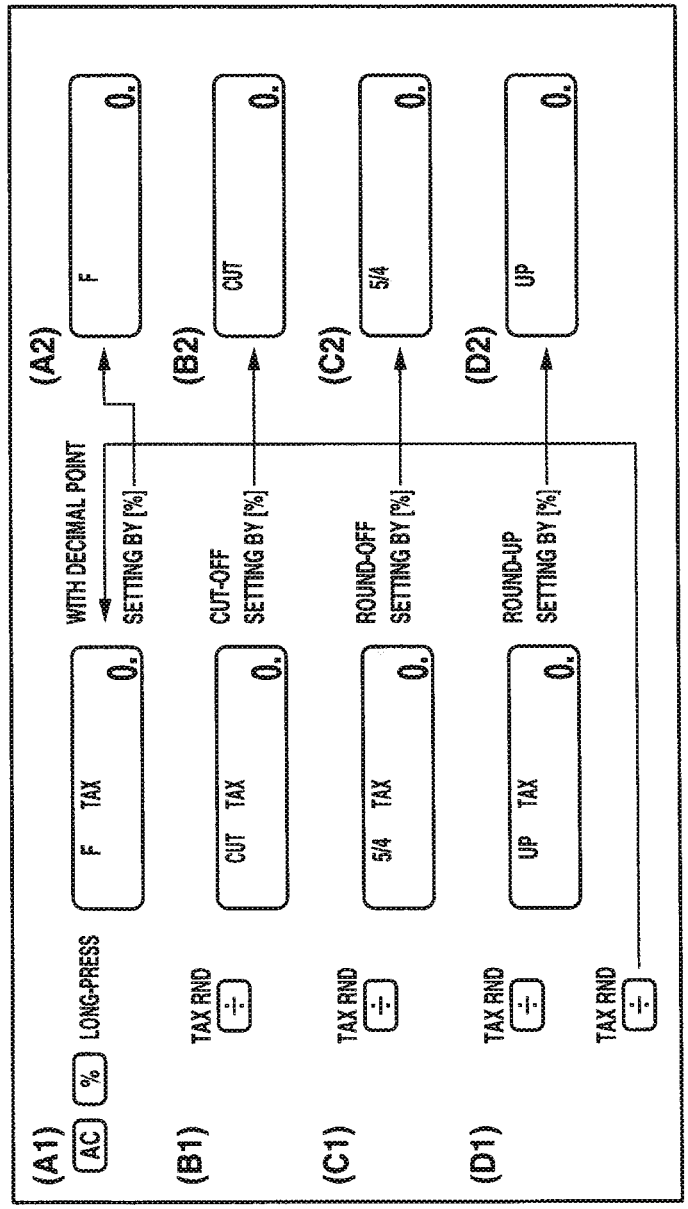
FIG. 9 is a view illustrating concrete examples of input operations and display for describing the tax calculation function of the electronic calculator in the embodiment.

Next, a method of setting a calculation method of a fraction process in the calculator 10B is described. FIG. 9 and FIG. 10 are views for describing the method of setting the calculation method of the fraction process.

In the calculator 10A illustrated in FIG. 1A, the round selector 11y and decimal point selector 11z are provided. Thus, the fraction process can be controlled (the calculation method of the fraction process can be set) by the settings of the round selector 11y and decimal point selector 11z. On the other hand, in the mini-just-type calculator 10B, the round selector 11y and decimal point selector 11z are not provided, and thus the calculation method of the fraction process is set by operations on the key input unit 11.

For example, when the [AC] key 11a and [%] key 11g were simultaneously long-pressed, the CPU 21 displays a screen for setting the calculation method of the fraction process, as illustrated in part (A1) of FIG. 9. In part (A1) of FIG. 9, a symbol representing a default setting, "F" setup (with a decimal point), of the fraction process is displayed. Here, each time the [÷] key 11h is operated, the calculation method that is the target of setting is successively changed to the setting of "CUT", "5/4" and "UP", as illustrated in parts (B1), (C1) and (D1) of FIG. 9. If the [%] key 11g is operated when any one of the calculation methods (symbols) is displayed, the CPU 21 sets the calculation method corresponding to the displayed symbol. Parts (A2), (B2), (C2) and (D2) of FIG. 9 illustrate setup screens corresponding to the respective cases at times when the [%] key 11g was operated.

In this manner, even in the case of the calculator 10B which is not provided with the round selector 11y and decimal point selector 11z, the calculation method of the fraction process corresponding to the user's request can be arbitrarily set, like the case of setting the round selector 11y and decimal point selector 11z of the calculator 10A.

FIG. 10 is a view for describing the differences of results of tax calculations corresponding to the respective calculation methods of the fraction process. Here, the tax calculations are executed with the tax rate 1 (10%).

In the case of "F" setup (part (A1) of FIG. 10), for example, if a numerical value "95" is input and the tax-included 1 calculation key 11b is operated, the CPU 21 causes the display unit 12 to display a tax-included amount with a decimal point, as illustrated in part (A2) of FIG. 10. Further, if the tax-included 1 calculation key 11b is operated, the CPU 21 causes the display unit 12 to display a tax amount with a decimal point, as illustrated in part (A3) of FIG. 10.

In the case of "CUT" setup (part (B1) of FIG. 10), for example, if a numerical value "95" is input and the tax-included 1 calculation key 11b is operated, the CPU 21 causes the display unit 12 to display a tax-included amount by cutting off a fraction after the decimal point, as illustrated in part (B2) of FIG. 10. Further, if the tax-included 1 calculation key 11b is operated, the CPU 21 causes the display unit 12 to display a tax amount by similarly cutting off a fraction after the decimal point, as illustrated in part (B3) of FIG. 10.

In the case of "5/4" setup (part (C1) of FIG. 10), for example, if a numerical value "95" is input and the tax-included 1 calculation key 11b is operated, the CPU 21 causes the display unit 12 to display a tax-included amount by rounding off a fraction after the decimal point, as illustrated in part (C2) of FIG. 10. Further, if the tax-included 1 calculation key 11b is operated, the CPU 21 causes the display unit 12 to display a tax amount by similarly rounding off a fraction after the decimal point, as illustrated in part (C3) of FIG. 10.

In the case of "UP" setup (part (D1) of FIG. 10), for example, if a numerical value "95" is input and the tax-included 1 calculation key 11b is operated, the CPU 21 causes the display unit 12 to display a tax-included amount by rounding up a fraction after the decimal point, as illustrated in part (D2) of FIG. 10. Further, if the tax-included 1 calculation key 11b is operated, the CPU 21 causes the display unit 12 to display a tax amount by similarly rounding up a fraction after the decimal point, as illustrated in part (D3) of FIG. 10.

In the above examples, the cases in which the tax-included 1 calculation key 11b was operated. However, when the tax-included 2 calculation key 11c (or tax-excluded 1 calculation key 11d or tax-excluded 2 calculation key 11e) was operated, the tax calculation is similarly executed in accordance with the preset calculation method of the fraction process, the calculation result is displayed on the display unit 12.

Thus, the calculation method of the fraction process, which corresponds to the user's request, can be reflected on the tax calculation.

In the above description, the cases, in which input operations are executed on the tax-included 1 calculation key 11b and tax-included 2 calculation key 11c, were described by way of example. However, the same process can be executed also in the cases where input operations are executed on the tax-excluded 1 calculation key 11d and tax-excluded 2 calculation key 11e. It is assumed, however, that when the tax-excluded 1 calculation key 11d or tax-excluded 2 calculation key 11e was operated, the CPU 21 causes the display unit 12 to display the tax-excluded amount with priority over the tax-included amount. In the other respects, the same process is executed as in the case where the tax-included 1 calculation key 11b or tax-included 2 calculation key 11c was operated.

Additionally, the methods described in the embodiments, that is, the respective methods of the processes, etc. illustrated in the flowcharts of FIG. 3 to FIG. 5, can all be stored as computer-executable programs in a storage medium, such as a memory card (ROM card, RAM card, etc.), a magnetic disk (flexible disk, hard disk, etc.), an optical disc (CD-ROM, DVD, etc.), or a semiconductor memory, and can be distributed. In addition, the computer reads the program, which is stored in the external storage medium, and the operation is controlled by this read-in program. Thereby, it is possible to realize the same processes as the functions described in the embodiments.

Additionally, the data of the program for realizing each of the above-described methods can be transmitted on a network (Internet) in the form of a program code, and the program data can be taken in from a computer (server apparatus, etc.) connected to this network (Internet), and thereby it is possible to realize the same functions as in the above-described embodiments.

The present invention is not limited to the above-described embodiments. In practice, various modifications may be made without departing from the spirit of the invention. In addition, the above-described embodiments include inventions in various stages, and various inventions can be derived from proper combinations of structural elements disclosed herein. For example, even if some structural elements in all the structural elements disclosed in the embodiments are omitted or combined, if the problems of the invention can be solved and advantageous effects can be obtained, the structure, in which the structural elements are omitted or combined, can be derived as an invention.

The invention claimed is:

1. A tax calculator comprising an input device, a display having a limited size and a processor, the input device including at least a first key, a second key, and a third key, the first key being operated when a process relating to a first tax rate is executed, the second key being operated when a process relating to a second tax rate is executed, and the third key being operated when a process relating to a tax calculation result is executed, the processor being configured to:
execute control to, when the first key is operated while a numerical value is displayed on the display, display on the display by switching from the numerical value displayed thereon, a tax calculation result that is calculated using the numerical value and the first tax rate,
execute control to, when the second key is operated while another numerical value is displayed on the display, display on the display by switching from the numerical value displayed thereon, a tax calculation result that is calculated using the other numerical value and the second tax rate,
execute control to display on the display by switching from any numerical value displayed thereon, a tax calculation result grand total amount in response to the third key being operated after the control to display the tax calculation result using the first tax rate is executed at least once and the control to display the tax calculation result using the second tax rate is executed at least once, the tax calculation result grand total amount being indicative of a grand total amount of a plurality of tax calculation results calculated by executing the control to display the tax calculation result more than once; and
execute control to display on the display by switching from any numerical value displayed thereon, a tax calculation result relating numeric value when one of the first key and the second key is operated after the control to display the tax calculation result grand total amount is executed, the tax calculation result relating numeric value being one of numeric values relating to the plurality of tax calculation results calculated by executing the control to display the tax calculation result more than once, the one being relating to any one of the tax calculation results, which corresponds to the operated one of the keys.

2. The tax calculator of claim 1, wherein
the control to display the tax calculation result includes calculating any one of tax-included amounts and any one of tax amounts while setting the displayed numeric value as any one of tax-excluded amounts, using the one of tax rates, which corresponds to the operated one of the keys, and
the control to display the tax calculation result relating numeric value includes executing control to switchingly display a tax calculation result by updating a screen of the display to display any one of a total of some of the tax-included amounts, a total of some of the tax-excluded amounts, corresponding to the some of the tax-included amount, and a total of some of the tax amounts, corresponding to the some of the tax-included amounts, every time the one of the keys is operated.

3. The tax calculator of claim 1, wherein the processor is configured to execute control to set a fraction process method by setting any one of a plurality of calculation methods of a fraction process, and
the control to display the tax calculation result, the control to display the tax calculation result grand total amount, or the control to display the tax calculation result relating numeric value includes displaying on the display a numeric value according to the tax calculation result, the tax calculation result grand total amount, or the any one of the tax computation results, by a form corresponding to any one of the calculation methods set by the control to set the fraction process method.

4. The tax calculator of claim 3, wherein the control to set the fraction process method includes making a transition to a state in which any one of the plurality of calculation methods of the fraction process is selectable, in response to two keys being operated in combination, selecting any one of the plurality of calculation methods of the fraction process in response to another key being operated, and setting the selected one of the calculation methods of the fraction process in response to one of the two keys being operated.

5. The tax calculator of claim 1, wherein the control to display the tax calculation result includes displaying on the display, when the one of the keys is operated, the tax calculation result and one of a first tax symbol corresponding to the first tax rate and a second tax symbol corresponding to the second tax rate, the one of the first and second tax symbols indicating that the tax calculation result is a result of a calculation using the one of the tax rates, which corresponds to the one of the keys.

6. The tax calculator of claim 1, wherein the control to display the tax calculation result grand total amount includes displaying on the display in response to the third key being operated, the tax calculation result grand total amount and a tax total symbol.

7. The tax calculator of claim 6, wherein
the control to display the tax calculation result includes calculating, while the displayed numeric value is set to a tax-excluded amount, a tax-included amount using the one of the tax rates, which corresponds to the operated one of the keys, and
the control to display the tax calculation result relating numeric value includes displaying on the display by updating a screen of the display, when the one of the keys is operated after the control to display the tax calculation result grand total amount is operated and while the tax total symbol is displayed, a numeric value according to one of a first tax-included amount corresponding to the first tax rate and a second tax-included amount corresponding to the second tax rate, the one of the first and second tax-included amounts being corresponding to the one of the tax rates corresponding to the operated one of the keys, as a numeric value according to the any one of the tax calculation results.

8. The tax calculator of claim 1, further comprising a memory, wherein the memory includes a first memory region that stores information on the first tax rate, and a second memory region that stores information on the second tax rate, and
the control to display the tax calculation result includes:
calculating a tax-included amount using the one of the tax rates, corresponding to the operated one of the keys while the displayed numeric value is set to a tax-excluded amount; and
storing the calculated tax-included amount into one of the first memory region and the second memory region of the memory, the one corresponding to the one of the tax rates.

9. The tax calculator of claim 8, wherein
the control to display the tax calculation result grand total amount includes obtaining a grand total amount of the plurality of tax-included amounts stored in the first memory region and the second memory region of the memory, and displaying on the display by updating a screen of the display, the obtained grand total amount of the tax-included amounts as the tax calculation result grand total amount, and
the control to display the tax calculation result relating numeric value includes, when the one of the keys is operated, obtaining a total of the tax-included amounts stored in one of the first memory region and the second memory region of the memory, the one corresponding to the any one of the keys, and displaying on the display by updating a screen of the display, the obtained total of the tax-included amounts as a numeric value according to the any one of the tax calculation results.

10. The tax calculator of claim 1, wherein the display has a limited number of rows for displaying the numerical values.

11. The tax calculator of claim 1, wherein the display has a single row for displaying the numerical values.

12. The tax calculator of claim 1, further comprising a housing having a longitudinal axis extending lengthwise therealong and a lateral axis extending transverse to the longitudinal axis and widthwise along the housing and further having the first, second and third keys and the display provided thereon, the display extending for a longitudinal distance that is less than approximately twice as long as a longitudinal distance that any one of the first, second and third keys extend.

13. The tax calculator of claim 1, further comprising a housing having a longitudinal axis extending lengthwise therealong and a lateral axis extending transverse to the longitudinal axis and widthwise along the housing and further having the first, second and third keys and the display provided thereon, the display extending for a longitudinal distance that is less than approximately one-seventh as long as a longitudinal distance that the housing extends.

14. The tax calculator of claim 1, further comprising a housing having a longitudinal axis extending lengthwise therealong and a lateral axis extending transverse to the longitudinal axis and widthwise along the housing and further having a key input unit including the first, second, and third keys and the display provided thereon, the display extending for a longitudinal distance that is less than approximately a quarter as long as a longitudinal distance that the key input unit extends.

15. A tax calculation method for controlling a tax calculator comprising an input device, a display having a limited size, and a processor, the input device including at least a first key, a second key, and a third key, the first key being operated when a process relating to a first tax rate is executed, the second key being operated when a process relating to a second tax rate is executed, and the third key being operated when a process relating to a tax calculation result is executed, the method comprising:
executing control to, when the first key is operated while a numerical value is displayed on the display, display on the display by switching from the numerical value displayed thereon, using the numerical value and the first tax rate,
executing control to, when the second key is operated while another numerical value is displayed on the display, display on the display by switching from the numerical value displayed thereon, a tax calculation result that is calculated using the other numerical value and the second tax rate,
executing control to display on the display by switching from any numerical value displayed thereon, a tax calculation result grand total amount in response to the third key being operated after the control to display the tax calculation result using the first tax rate is executed at least once and the control to display the tax calculation result using the second tax rate is executed at least once, the tax calculation result grand total amount being indicative of a grand total amount of a plurality of tax calculation results calculated by executing the control to display the tax calculation result more than once; and
executing control to display on the display by switching from any numerical value displayed thereon, a tax calculation result relating numeric value when one of the first key and the second key is operated after the control to display the tax calculation result grand total amount is executed, the tax calculation result relating numeric value being one of numeric values relating to the plurality of tax calculation results calculated by executing the control to display the tax calculation result more than once, the one being relating to any one of the tax calculation results, which corresponds to the operated one of the keys.

16. The tax calculation method of claim 15, wherein
the executing control to display the tax calculation result includes calculating any one of tax-included amounts and any one of tax amounts while setting the displayed numeric value as any one of tax-excluded amounts, using the one of tax rates, which corresponds to the operated one of the keys, and
the executing control to display the tax calculation result relating numeric value includes executing control to switchingly display a tax calculation result by updating a screen of the display to display any one of a total of some of the tax-included amounts, a total of some of the tax-excluded amounts, corresponding to the some of the tax-included amount, and a total of some of the tax amounts, corresponding to the some of the tax-included amounts, every time the one of the keys is operated.

17. The tax calculation method of claim 15, wherein the processor is configured to execute control to set a fraction process method by setting any one of a plurality of calculation methods of a fraction process, and
the executing control to display the tax calculation result, the executing control to display the tax calculation result grand total amount, or the executing control to display the tax calculation result relating numeric value includes displaying on the display a numeric value according to the tax calculation result, the tax calculation result grand total amount, or the any one of the tax computation results, by a form corresponding to any one of the calculation methods set by the control to set the fraction process method.

18. The tax calculation method of claim 17, wherein the control to set the fraction process method includes making a transition to a state in which any one of the plurality of calculation methods of the fraction process is selectable, in response to two keys being operated in combination, selecting any one of the plurality of calculation methods of the fraction process in response to another key being operated, and setting the selected one of the calculation methods of the fraction process in response to one of the two keys being operated.

19. The tax calculation method of claim 15, wherein the executing control to display the tax calculation result includes displaying on the display, when the one of the keys is operated, the tax calculation result and one of a first tax symbol corresponding to the first tax rate and a second tax symbol corresponding to the second tax rate, the one of the first and second tax symbols indicating that the tax calculation result is a result of a calculation using the one of the tax rates, which corresponds to the one of the keys.

20. A non-transitory storage medium storing a computer-readable program for controlling a computer of an electronic apparatus including an input device, the input device including at least a first key, a second key, and a third key, the first key being operated when a process relating to a first tax rate is executed, the second key being operated when a process relating to a second tax rate is executed, and the third key being operated when a process relating to a tax calculation result is executed, a display having a limited size, the program causing the computer to:
cause the, when the first key is operated while a numerical value is displayed on the display, display to display by switching from the numerical value displayed thereon, a tax calculation result that is calculated, using the numerical value and the first tax rate;
cause the, when the second key is operated while another numerical value is displayed on the display, display on the display by switching from the numerical value displayed thereon, a tax calculation result that is calculated using the other numerical value and the second tax rate,
cause the display to display by switching from any numerical value displayed thereon, a tax calculation result grand total amount in response to the third key being operated after the control to display the tax calculation result using the first tax rate is executed at least once and the control to display the tax calculation result using the second tax rate is executed at least once, the tax calculation result grand total amount being indicative of a grand total amount of a plurality of tax calculation results calculated by executing the control to display the tax calculation result more than once; and
cause the display to display by switching from any numerical value displayed thereon, a tax calculation result relating numeric value when one of the first key and the second key is operated after the control to display the tax calculation result grand total amount is executed, the tax calculation result relating numeric value being one of numeric values relating to the plurality of tax calculation results calculated by executing the control to display the tax calculation result more than once, the one being relating to any one of the tax calculation results, which corresponds to the operated one of the keys.

21. The non-transitory storage medium of claim 20, wherein causing the display to display the tax calculation result includes calculating any one of tax-included amounts and any one of tax amounts while setting the displayed numeric value as any one of tax-excluded amounts, using the one of tax rates, which corresponds to the operated one of the keys, and
causing the display to display the tax calculation result relating numeric value includes switchingly displaying a tax calculation result by updating a screen of the display to display any one of a total of some of the tax-included amounts, a total of some of the tax-excluded amounts, corresponding to the some of the tax-included amount, and a total of some of the tax amounts, corresponding to the some of the tax-included amounts, every time the one of the keys is operated.

22. The non-transitory storage medium of claim 20, wherein the program causes the computer to set a fraction process method by setting any one of a plurality of calculation methods of a fraction process, and
causing the display to display the tax calculation result, causing the display to display the tax calculation result grand total amount, or causing the display to display the tax calculation result relating numeric value includes causing the display to display on the display a numeric value according to the tax calculation result, the tax calculation result grand total amount, or the any one of the tax computation results, by a form corresponding to any one of the calculation methods set by the fraction process method.

23. The non-transitory storage medium of claim 22, wherein the setting the fraction process method includes making a transition to a state in which any one of the plurality of calculation methods of the fraction process is selectable, in response to two keys being operated in combination, selecting any one of the plurality of calculation methods of the fraction process in response to another key being operated, and setting the selected one of the calculation methods of the fraction process in response to one of the two keys being operated.

24. The non-transitory storage medium of claim 20, wherein causing the display to display the tax calculation result includes displaying on the display, when the one of the keys is operated, the tax calculation result and one of a first tax symbol corresponding to the first tax rate and a second tax symbol corresponding to the second tax rate, the one of the first and second tax symbols indicating that the tax calculation result is a result of a calculation using the one of the tax rates, which corresponds to the one of the keys.

* * * * *